(12) United States Patent
Yuen et al.

(10) Patent No.: US 6,204,721 B1
(45) Date of Patent: *Mar. 20, 2001

(54) METHOD AND APPARATUS FOR SWITCHING A WELL POTENTIAL IN RESPONSE TO AN OUTPUT VOLTAGE

(75) Inventors: Guy S. Yuen; Chinh D. Nguyen, both of San Jose, CA (US)

(73) Assignee: Programmable Microelectronics Corp., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/082,485

(22) Filed: May 20, 1998

(51) Int. Cl.[7] ..................................................... H03K 0/31
(52) U.S. Cl. ........................................... 327/534; 327/535
(58) Field of Search .................................. 327/534, 535, 327/536, 589

(56) References Cited

U.S. PATENT DOCUMENTS

| | | | | |
|---|---|---|---|---|
| 5,243,236 | * | 9/1993 | McDaniel | 326/68 |
| 5,338,978 | * | 8/1994 | Larsen et al. | 326/21 |
| 5,371,419 | * | 12/1994 | Sundby | 327/543 |
| 5,396,128 | * | 3/1995 | Dunning et al. | 326/68 |
| 5,553,295 | * | 9/1996 | Pantelakis et al. | 395/750 |
| 5,914,632 | * | 6/1999 | Fotouhi et al. | 327/537 |

\* cited by examiner

*Primary Examiner*—Timothy P. Callahan
*Assistant Examiner*—Hai L. Nguyen
(74) *Attorney, Agent, or Firm*—William L. Paradice, III

(57) ABSTRACT

A switching circuit includes a switch having first and second terminals coupled between a voltage supply and ground potential and having a control terminal coupled to receive a control signal indicative of the output voltage of an associated semiconductor circuit. The switch also includes an output terminal coupled to the well region within which is formed the associated semiconductor circuit. In preferred embodiments, the control signal transitions from a first state to a second state when the output voltage exceeds a predetermined potential. In response thereto, the switching circuit changes the well potential of the associated semiconductor circuit from a first voltage to ground potential, wherein the first voltage is greater than ground potential.

12 Claims, 5 Drawing Sheets

METHOD AND APPARATUS FOR SWITCHING A WELL POTENTIAL IN RESPONSE TO AN OUTPUT VOLTAGE

BACKGROUND

1. Field of Invention

This invention relates generally to PMOS semiconductor memories and specifically to adjusting well potential levels in response to changes in output voltage levels.

2. Description of Related Art

FIG. 1 shows a, PMOS negative charge pump 10 having four diode-capacitor stages each including an MOS capacitor C and a diode-connected PMOS transistor D. The diode-connected transistors have a threshold voltage VT equal to, for instance, 0.7 volts. Odd numbered stages are driven by a clock signal CLK. Even numbered stages are driven by the complementary clock signal $\overline{CLK}$. Clock signals CLK and $\overline{CLK}$ swing between ground potential and a positive voltage $V_{CLK}$ equal to, for instance, a supply voltage $V_{DD}$ of about 3 volts.

The negative charge pump 10 is typically formed in one or more n– well regions of a p– substrate. FIG. 2 shows the negative charge pump 10 formed in a single n– well region 11 of a p– substrate 12. The p+ diffusion regions 13–18 serve as the source/drain regions of the PMOS diode-connected transistors $D_0$–$D_4$, where the p+ source region 13 of the first diode $D_0$ is coupled to ground potential and the p+ drain region 18 of the last diode $D_4$ is coupled to the output terminal OUT of the negative charge pump 10. A p+ diffusion region 19 serves as the p+ contact for the n– well region 11 and is coupled to a welltap terminal WT.

During operation of the negative charge pump 10, the p– substrate 12 is grounded and the n– well region 11 is held at the supply voltage $V_{DD}$, thereby preventing the p/n junction therebetween from forward biasing. Initially, the clock signal CLK is low (at ground potential) and its complement signal $\overline{CLK}$ is high (at $V_{DD}$). The threshold voltage $V_T$ of the first stage diode Do forces associated node $N_1$ to one diode-drop $|V_T|$ above ground potential, i.e., to about 0.7 volts. The first capacitor $C_1$ is thus charged to about 3 volts with respect to ground potential. On the next clock cycle, clock signal $\overline{CLK}$ transitions low to ground potential and pushes node $N_1$ to a voltage equal to $|V_T|$–$V_{CLK}$=0.7–3=–2.3 volts. The second stage node $N_2$ is driven to one diode drop above node $N_1$, i.e., to about –1.6 volts (ideally). Since the clock signal CLK is at $V_{CLK}$=3 volts, there is about a –4.6 volt drop across the capacitor $C_2$ (ideally). On the following clock cycle, clock signal CLK transitions to ground potential and pushes node $N_2$ from –1.6 volts to –3 volts (ideally). Operation continues as described above, until node $N_4$, and thus the output terminal OUT, are driven to a high negative voltage. Note that the output terminal OUT (i.e., p+ region 18) is a diode drop $|V_T|$ more positive than is node N4 (i.e., p+ region 17).

In some applications, such as when providing erase voltages to a PMOS floating gate memory cell of the type disclosed in U.S. Pat. No. 5,687,118, a negative potential of –11 volts or more is required. The maximum negative voltage of the output terminal OUT is given by:

$$V_{OUT}(MAX) = V_{BD} - V_{DD} - V_T$$

where, $V_{BD}$ is the breakdown voltage of the p+ region 17/n– well region 11 junction and $V_T$ is the threshold voltage of PMOS diode $D_4$. Since the breakdown voltage $V_{BD}$ is typically about –11 volts, and assuming $V_{DD}$=3 volts and $V_T$=–1 volts, the output terminal OUT of the pump 10 is limited to about –8 volts.

In addition, as the voltage differential between the p+region 17 and the n– well region 11 increases, so does the threshold voltage $V_T$ of the PMOS diode-connected transistors D of the negative charge pump 10. Since the threshold voltage $V_T$ limits the amount by which each stage of the negative charge pump 10 may pull down its output voltage, efficiency of the negative charge pump 10 is also compromised by the increase in $V_T$ (in the negative direction) due to a higher back bias between each of the p+ regions 14–18 and the n– well region 11.

SUMMARY

A switching circuit is disclosed which switches the well potential of a semiconductor circuit in response to changes in the output voltage of that circuit. A switching circuit in accordance with the present invention includes a switch having first and second terminals coupled between a voltage supply and ground potential and having a control terminal coupled to receive a control signal indicative of the output voltage of an associated semiconductor circuit. The switch also includes an output terminal coupled to the well region within which is formed the associated semiconductor circuit. In preferred embodiments, the control signal transitions from a first state to a second state when the output voltage exceeds a predetermined potential. In response thereto, the switching circuit changes the well potential of the associated semiconductor circuit from a first voltage to ground potential, wherein the first voltage is greater than ground potential.

BRIEF DESCRIPTION OF THE DRAWINGS

FIG. 6 is a schematic diagram of a buffer circuit in accordance with the embodiment of FIG. 5, and.

Like components in the Figures are similarly labeled.

DETAILED DESCRIPTION

Principles of the present invention are described below with reference to the PMOS negative charge pump 10 shown in FIGS. 1 and 2 for simplicity only. It is to be understood that embodiments of the present invention may be employed to switch well potentials of other circuits. Accordingly, the present invention is not to be construed as limited to specific examples herein but rather includes within its scope all embodiments defined by the appended claims.

Figure 3:
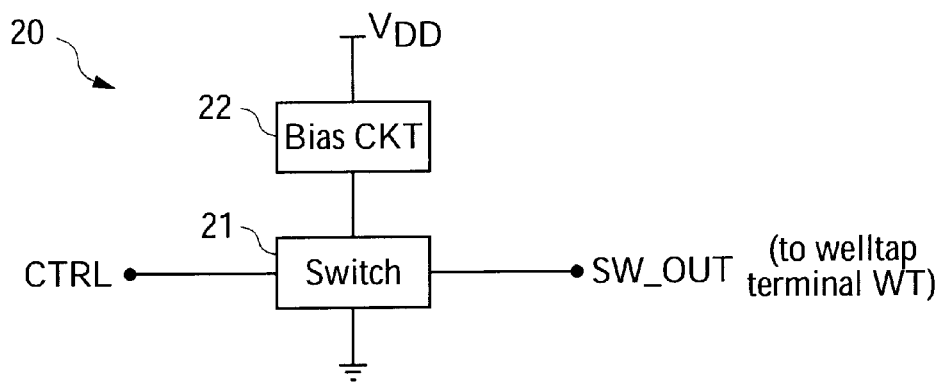
FIG. 3 is a block diagram of a switching circuit in accordance with the present invention.

FIG. 3 shows a switching circuit 20 in accordance with the present invention. The circuit 20 includes a switch 21 which, in response to a control signal CTRL, alternately couples its output terminal OUT between a first voltage $V_1$ and ground potential. The output terminal SW-OUT of the switching circuit 20 is connected to the n– well region 11 of the negative charge pump 10 of FIG. 1 via the welltap terminal WT. In some embodiments, a bias circuit 22 provided between the supply voltage $V_{DD}$ and the switch 21 allows for precise control over the magnitude of the voltage $V_1$. Preferably, the bias circuit 22 includes a bypass mode that allows the output terminal SW-OUT of the switching circuit 20 to be driven to the supply voltage $V_{DD}$.

Figure 4:
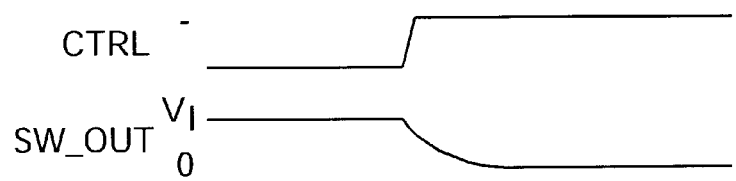
FIG. 4 is a timing diagram illustrating waveforms of a control signal and an output terminal in accordance with present embodiments.

The control signal CTRL facilitates discharging of n– well region 11 (see also FIG. 2) of the negative charge pump 10 from voltage $V_1$ to ground potential, as described below. Initially, the control signal CTRL is in a first logic state. In response thereto, the switch 21 couples its output terminal SW-OUT, and thus the n– well region 11, to the supply voltage $V_{DD}$ (here, assuming that the bias circuit 22 is in the bypass mode so that $V_1=V_{DD}$). Thus, the n– well region 11, within which is formed the negative charge pump 10, is initially at about 3 volts. As discussed above, the voltage differential across the junction formed by p+ region 17 and the n– well region 11, which determines the maximum voltage at the output terminal OUT of the negative charge pump 10, increases as the pump 10 drives its output terminal OUT more and more negative with each successive clock. When the voltage at the output terminal OUT becomes more negative than a predetermined reference voltage $V_{ref}$, which in some embodiments is between –3 and –10 volts, the control signal CTRL transitions from the first logic state to a second logic state. In response thereto, the switch 21 couples its output terminal SW-OUT to ground potential and thereby discharges the n– well region 11 toward ground potential, as illustrated in FIG. 4.

Consequently, the voltage differential across the p+region 17/n– well region 11 junction is reduced by an amount equal to the voltage $V_1$. This reduction in the p+ region 17/n– well region 11 voltage differential allows for the output terminal OUT of associated pump 10 to reach –11 volts, as compared to a maximum negative voltage of –8 volts before the n– well region 11 is switched from 3 volts to ground potential. The resulting output voltage of the associated negative charge pump 10 is thereby regulated by the breakdown voltage $V_{BD}$ and may be expressed as:

$$V_{OUT}=V_{BD}+V_{DD}-V_T=V_{OUT}=-12+0+1=-11 \text{ volts}$$

Further, since lowering the voltage of the n– well region 11 by an amount equal to $V_1$ effects a decrease in the threshold voltage $V_T$ of the diode-connected transistors D of the negative charge pump 10 (see also FIGS. 1 and 2), present embodiments allow the p+ source region of each diode stage to pull the succeeding diode stage down further, as compared to conventional techniques which do not adjust the potential of the n– well region 11, and thus improve the efficiency of the negative charge pump 10.

Figure 7:
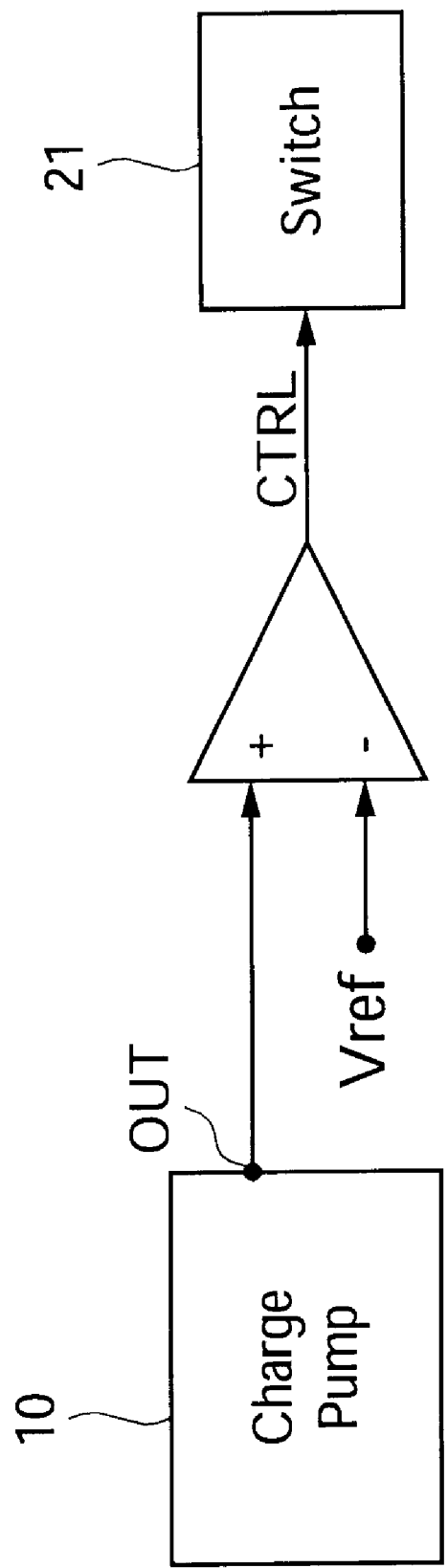
FIG. 7 is a block diagram showing a comparator connected between the negative charge pump of FIG. 1 and the switching circuit of FIG. 5.

In some embodiments, a conventional comparator circuit 70 having a threshold or reference voltage equal to $V_{ref}$ is employed in a well known manner to receive the voltage at the output terminal OUT of the negative charge pump 10 and, in response thereto, provides the control signal CTRL to the switch 21, as shown in FIG. 7. Here, the comparator circuit transitions the control signal CTRL from the first logic state to the second logic state when the voltage at the output terminal OUT of the negative charge pump 10 exceeds $V_{ref}$. In this manner, the n– well region 11 of the negative charge pump 10 is discharged from an initial voltage of $V_1$ to ground potential when the output voltage of the negative pump 10 becomes more negative than $V_{ref}$.

In other embodiments, the control signal CTRL is generated in a well known manner using a timing circuit that discharges the n– well region 11 after a predetermined period of time. Here, the predetermined period of time corresponds with the charging rate of the negative charge pump 10 so that the n– well region 11 is discharged to ground potential at a point which corresponds with the output voltage of the negative charge pump 10 being more negative than some predetermined potential such as, for instance, $V_{ref}$.

Figure 5:
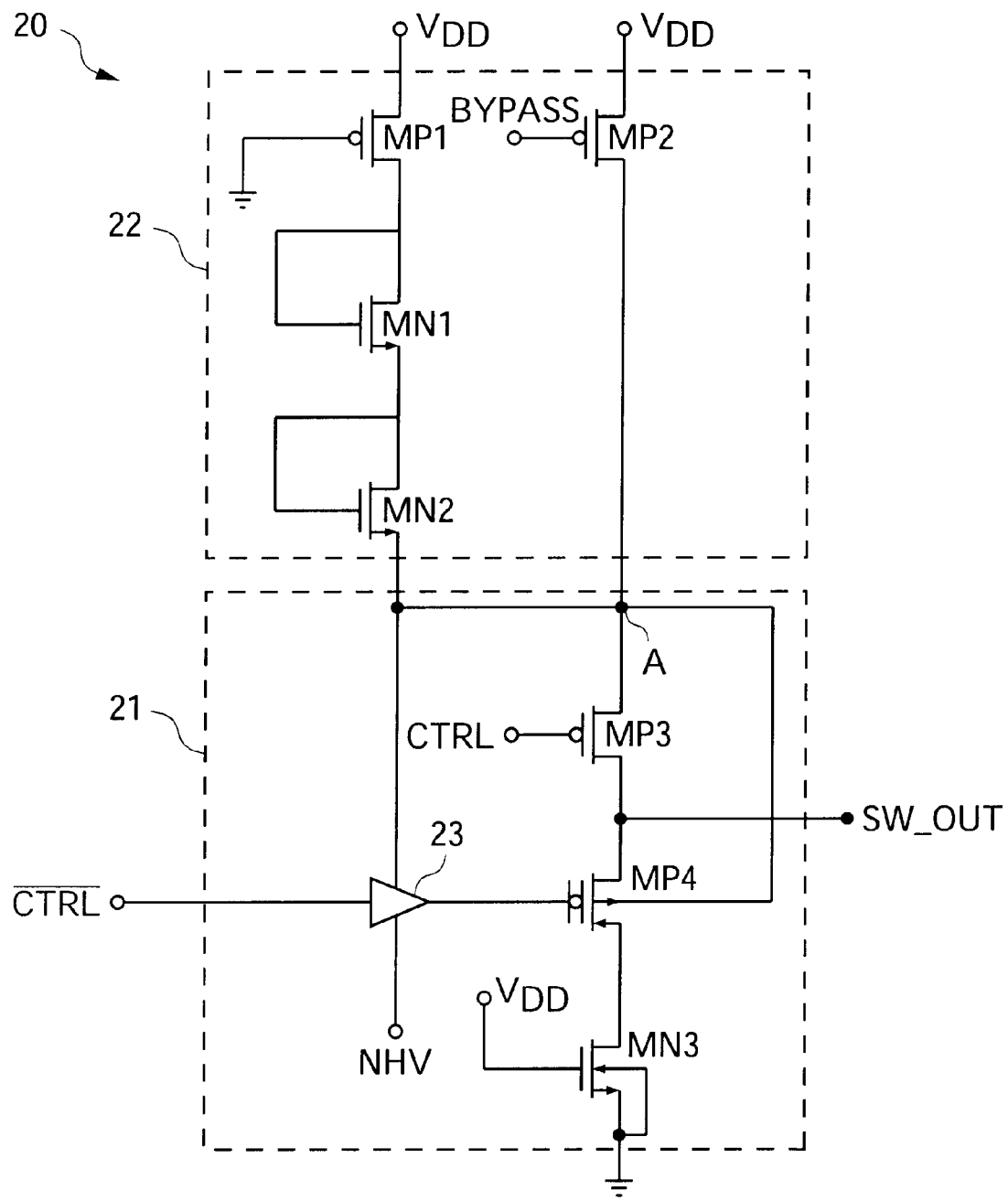
FIG. 5 is a schematic diagram of a switching circuit in accordance with one embodiment of the present invention.

FIG. 5 shows a preferred embodiment of the present invention. Here, the bias circuit 22 includes first and second segments connected in parallel between the supply voltage $V_{DD}$ and a node A. The first leg includes a PMOS pass transistor MP1 connected in series with two NMOS diode-connected transistors MN1 and MN2. The gate of the PMOS pass transistor MP1 is coupled to ground potential so that the pass transistor MP1 is maintained in a conductive state. Each of the diode-connected transistors MN1 and MN2 provides a diode drop ($V_T$) of about 0.7 volts so that, when configured as shown in FIG. 5, node A is approximately 1.4 volts below $V_{DD}$. In other embodiments, the voltage at node A may be adjusted by increasing or decreasing the number of diode-connected transistors connected in series with the pass transistor MP1 and/or by adjusting the threshold voltage $V_T$ of such diode-connected transistors.

The second segment of the bias circuit 22 includes a PMOS pass transistor MP2 coupled between $V_{DD}$ and node A and having a gate coupled to receive a signal BYPASS. When the signal BYPASS is in a logic high state, the pass transistor MP2 is non-conductive and thereby allows the voltage $V_1$ at node A to be set by the first segment, i.e., by the respective voltage drops $V_T$ of the diode-connected transistors MN1 and MN2. When it is desired to charge node A to $V_{DD}$, the signal BYPASS is driven low to ground potential. In response thereto, the PMOS pass transistor MP2 turns on and shorts node A to the supply voltage $V_{DD}$ so that $V_1=V_{DD}$. This is the bypass mode.

The switch 21 includes a PMOS pull-up transistor MP3 connected between node A and the output terminal SW-OUT of the switching circuit 20 and having a gate coupled to receive the control signal CTRL. A PMOS pull-down transistor MP4 and an NMOS bias transistor MN3 are connected in series between the output terminal SW-OUT and ground potential. The gate of the NMOS bias transistor MN3 is coupled to $V_{DD}$ so as to maintain transistor MN3 in a conductive state. The gate of the pull-down transistor MP4 is coupled to an output terminal of a buffer circuit 23 which, in response to the complementary control signal $\overline{CTRL}$, alternately couples the gate of the pull-down transistor MP4 between the voltage $V_1$ at node A and a high negative voltage NHV. In some embodiments, this high negative voltage NHV is generated by an associated negative charge pump, e.g., via the output terminal OUT of the negative charge pump 10 of FIGS. 1 and 2. The complementary control signal $\overline{CTRL}$ is generated in a well known manner by logically inverting the control signal CTRL.

As discussed above, the control signal CTRL is initially in a logic low state. In response thereto, the PMOS pull-up transistor MP3 turns on and couples the output terminal OUT to node A, thereby pulling the voltage at the output terminal OUT to the voltage $V_1$. The logic high signal $\overline{CTRL}$ drives the buffer circuit 23 so as to couple the gate of the PMOS pull-down transistor MP4 to node A and, thus to the positive voltage $V_1$. In response thereto, the pull-down transistor MP4 is non-conductive and thereby isolates the output terminal SW-OUT from ground potential. Thus, when the control signal CTRL is low, the switching circuit 20 maintains the n– well region 11 (see FIG. 2) at the voltage $V_1$.

When the control signal CTRL transitions to the logic high state, e.g., to $V_{DD}$, the pull-up transistor MP3 is in a non-conductive state and thereby isolates the output terminal SW-OUT from node A (and thus from the voltage $V_1$). The signal $\overline{\text{CTRL}}$ is low and, in response thereto, drives the buffer 23 so as to couple the gate of the pull-down transistor MP4 to the negative high voltage NHV. As a result, the pull-down transistor MP4 turns on and pulls the output terminal SW-OUT of the switching circuit 20 to ground potential. Thus, where the output terminal OUT is coupled to the n– well region 11 of the negative charge pump 10 via the welltap terminal WT, the transitioning of the control signal CTRL from low to high discharges the n– well region 11 from $V_1$ to ground potential. A negative gate voltage is desirable to turn on the pull-down transistor MP4 since the drain of the pull-down transistor MP4 is coupled to ground potential via bias transistor MN3.

The rate at which the output terminal SW-OUT of the switching circuit 20 discharges, and thus the rate at which the n– well region 11 discharges, may be adjusted by manipulating the current-carrying capacity of the pull-down transistor MP4 and/or of the pass transistor MN3.

Figure 6:
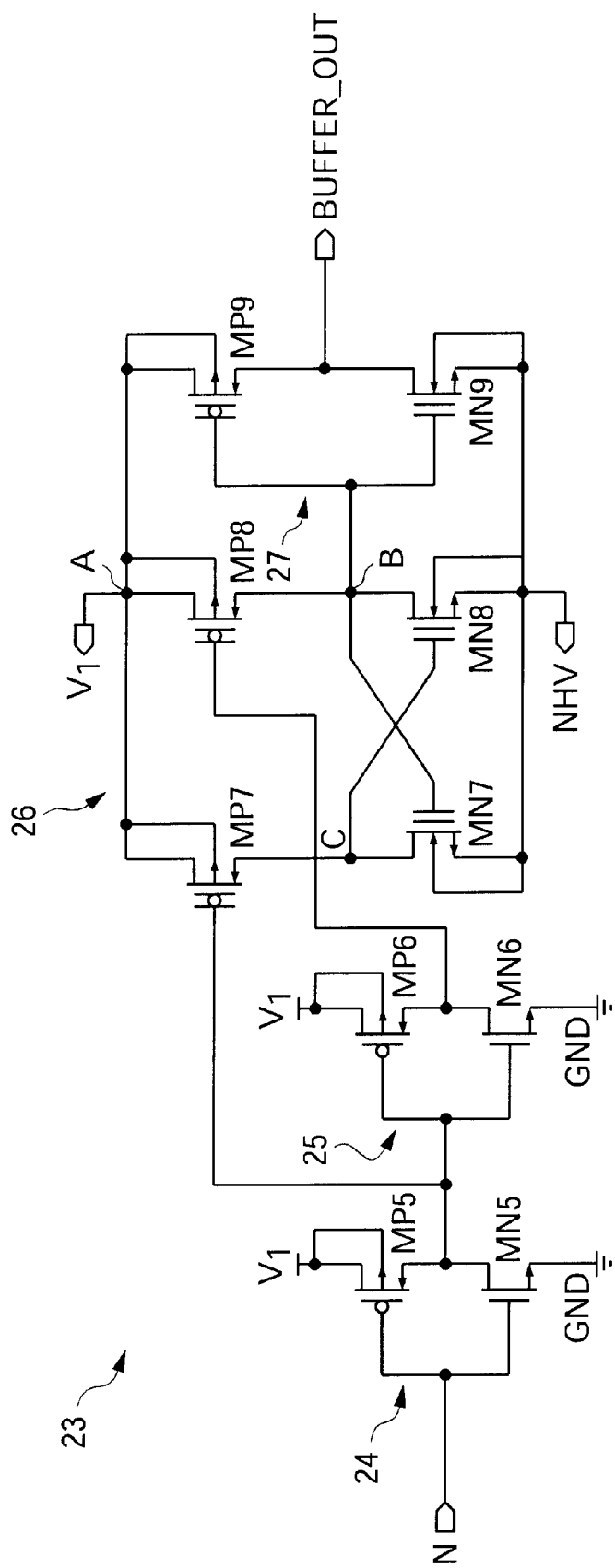

FIG. 6 shows the buffer circuit 23 in a preferred embodiment. Here, the control signal CTRL is coupled to the input terminal of a CMOS inverter 24 formed by a series-connection of a PMOS transistor MP5 and an NMOS transistor MN5 between node A (voltage $V_1$) and ground potential. The output terminal of the inverter 24 is coupled to an input terminal of a second CMOS inverter 25 and to a first input terminal of a cross-coupled latch 26. The output terminal of the second CMOS inverter 25, which is formed by a PMOS transistor MP6 and an NMOS transistor MN6, is coupled to a second input terminal of the latch 26.

Figure 1:
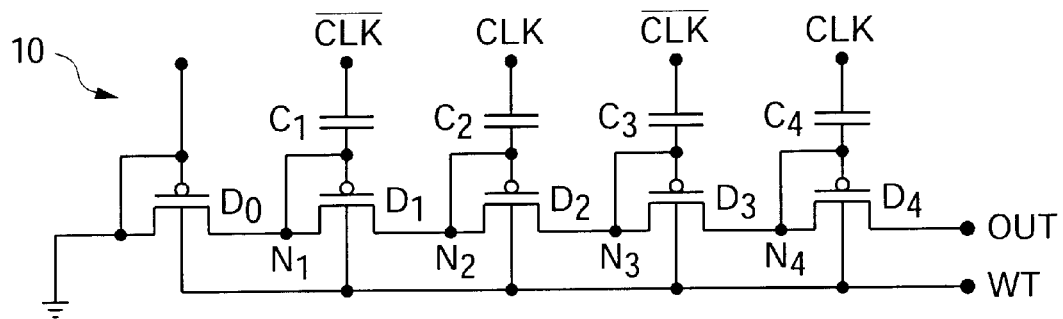
FIG. 1 is a schematic diagram of a conventional PMOS negative charge pump.
Figure 2:
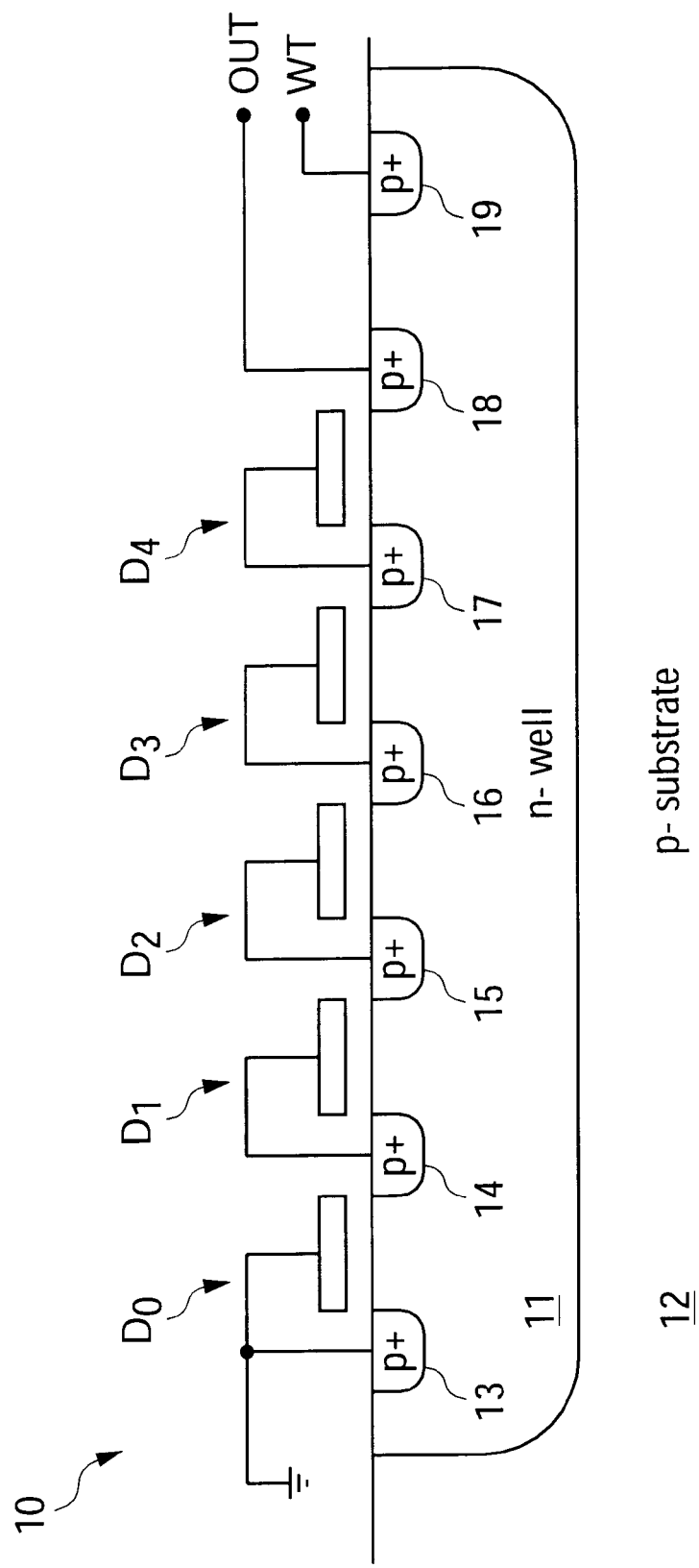
FIG. 2 is a cross-sectional view of the negative charge pump of FIG. 1.

The cross-coupled latch 26 includes PMOS transistors MP7 and MP8 and NMOS transistors MN7 and MN8, configured as shown in FIG. 6, where the sources of PMOS transistors MP7 and MP8 are coupled to receive the voltage $V_1$ at node A and the sources of the NMOS transistors MN7 and MN8 are coupled to receive the high negative voltage NHV generated, for instance, by the negative charge pump 10 (see also FIGS. 1 and 2). The latch 26 provides an output signal at node B which, as seen in FIG. 6, is commonly coupled to the gate of transistor MN7 and to the respective drains of transistors MP8 and MN8. The signal at node B is inverted by a third CMOS inverter 27 and provided to the gate of the pull-down transistor MP4 of the switching circuit 20 (see also FIG. 5) via the output terminal BUFFER-OUT of the buffer 23. The inverter 27 is formed by a PMOS transistor MP9 and an NMOS transistor MN9 coupled between node A and the high negative voltage NHV.

As mentioned above, the control signal CTRL is initially low (at ground potential) and, thus, the complement signal $\overline{\text{CTRL}}$ is initially high (at $V_{DD}$). Here, the first CMOS inverter 24 provides a logic low signal to the gate of transistor MP7. Transistor MP7 turns on and couples node C to node A, thereby pulling node C high to $V_1$ (see FIG. 6). The second CMOS inverter 26 provides a logic high signal to the gate of transistor MP8 which, in turn, turns off and isolates node B from node A. With node C at the positive voltage $V_1$, the transistor MN8 turns on and pulls node B to the high negative voltage NHV. In response thereto, transistor MP9 turns on and pulls the output terminal OUT to node A and, thus, pulls the gate of the pull-down transistor MP4 of the switching circuit 20 (FIG. 5) to the voltage $V_1$. Transistor MN9 turns off and isolates the output terminal OUT of the buffer 23 from the high negative voltage NHV. The high negative voltage at node B also ensures that transistor MN7 remains off, thereby isolating node C from the high negative voltage NHV.

When the control signal CTRL transitions to logic high, the signal $\overline{\text{CTRL}}$ transitions to logic low (ground potential). The first CMOS inverter 24 provides a logic high signal to the gate of transistor MP7, and the second CMOS inverter 26 provides a logic low signal to the gate of transistor MP8. Transistor MP7 turns off and isolates node C from node A. Transistor MP8 turns on and couples node B to node A, thereby pulling node B high to $V_1$. In response thereto, transistor MN9 turns on and pulls the output terminal OUT to the high negative voltage NHV, while transistor MP9 turns off and isolates the output terminal OUT from node A. The positive potential at node B ($V_1$) turns transistor MN7 on, thereby coupling the gate of transistor MN8 to the high negative voltage NHV. This ensures that transistor MN8 remains in a non-conductive state, thereby isolating node B from the high negative voltage NHV.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention. For instance, present embodiments may be adapted for use with positive charge pumps fabricated using triple well technology.

We claim:

1. A circuit for switching one or more well regions of a negative charge pump between first and second potentials in response to an output voltage of said negative charge pump, said circuit comprising:
    a first terminal coupled to said first potential;
    a second terminal coupled to said second potential;
    a control terminal coupled to receive a control signal; and
    an output terminal coupled to said one or more well regions, said circuit switching said one or more well regions from said first potential to said second potential when said control signal indicates that the output voltage of said charge pump has become more negative than a reference potential.

2. The apparatus of claim 1, further comprising a bias circuit coupled between said first potential and a supply voltage, said bias circuit having a bypass mode during which said bypass circuit shorts said first terminal of said circuit to said supply voltage.

3. The apparatus of claim 1, wherein said second potential is more negative than said first potential.

4. The apparatus of claim 3, wherein said first potential comprises a positive potential and said second potential comprises ground potential.

5. The apparatus of claim 4, wherein said first potential comprises a supply voltage.

6. The apparatus of claim 3, wherein said well region comprises an n conductivity type material and said negative charge pump comprises a plurality of PMOS diode-connected transistors.

7. The apparatus of claim 1, further comprising:
    a pull-up transistor connected between said first terminal and said output terminal and having a gate coupled to receive said control signal;
    a pull-down transistor connected between said output terminal and said second terminal and having a gate; and a buffer circuit connected between said control terminal and said gate of said pull-down transistor, said buffer circuit controlling the conductivity of said pull-down transistor in response to a complement of said control signal.

8. The apparatus of claim 7, wherein said buffer circuit further comprises a first terminal coupled to said first potential and a second terminal coupled to receive a high negative voltage, wherein said buffer circuit pulls said gate of said pull-down transistor to said first potential when said complement control signal is in a first state and to said high negative voltage when said complement control signal is in a second state.

9. The apparatus of claim 8, wherein said buffer circuit further comprises a cross-coupled latch coupled between said first potential and said high negative voltage.

10. The apparatus of claim 8, further comprising a pass transistor coupled between said pull-down transistor and said second potential.

11. The apparatus of claim 10, wherein said pull-up and pull-down transistors comprise PMOS transistors.

12. A method for increasing a negative output voltage provided by a negative charge pump formed in an n– well region of an underlying p– substrate, said method comprising the steps of:

connecting said n– well region to a first potential; and switching said n– well region from said first potential to a second potential in response to said output voltage of said negative charge pump becoming more negative than a reference voltage, wherein said second potential is more negative than said first potential.

* * * * *